United States Patent
Wright

(10) Patent No.: US 12,493,874 B2
(45) Date of Patent: Dec. 9, 2025

(54) COMPUTER-IMPLEMENTED SYSTEMS AND METHODS FOR CONTROLLING OR ENFORCING PERFORMANCE OF TRANSFERS CONDUCTED OVER A BLOCKCHAIN

(71) Applicant: nChain Holdings Limited, St. John's (AG)

(72) Inventor: Craig Steven Wright, London (GB)

(73) Assignee: NCHAIN LICENSING AG, Zug (CH)

(\*) Notice: Subject to any disclaimer, the term of this patent is extended or adjusted under 35 U.S.C. 154(b) by 358 days.

(21) Appl. No.: 17/417,064

(22) PCT Filed: Dec. 17, 2019

(86) PCT No.: PCT/IB2019/060897
§ 371 (c)(1),
(2) Date: Jun. 21, 2021

(87) PCT Pub. No.: WO2020/128814
PCT Pub. Date: Jun. 25, 2020

(65) Prior Publication Data
US 2022/0051236 A1  Feb. 17, 2022

(30) Foreign Application Priority Data
Dec. 21, 2018 (GB) .................... 1820947

(51) Int. Cl.
*G06Q 20/38* (2012.01)
*G06Q 20/02* (2012.01)
(Continued)

(52) U.S. Cl.
CPC ......... *G06Q 20/3827* (2013.01); *G06Q 20/02* (2013.01); *G06Q 20/065* (2013.01); *G06Q 20/3823* (2013.01); *G06Q 20/405* (2013.01)

(58) Field of Classification Search
None
See application file for complete search history.

(56) References Cited

U.S. PATENT DOCUMENTS

| 10,050,779 B2 | 8/2018 | Alness et al. |
| 2015/0269539 A1* | 9/2015 | MacGregor .......... G06Q 20/065 705/39 |

(Continued)

FOREIGN PATENT DOCUMENTS

| AU | 2017222470 A1 | 8/2018 |
| CN | 108399533 A | 8/2018 |

(Continued)

OTHER PUBLICATIONS

S. Bistarelli, I. Mercanti and F. Santini, "An Analysis of Non-standard Bitcoin Transactions," 2018 Crypto Valley Conference on Blockchain Technology (CVCBT), Zug, Switzerland, 2018, pp. 93-96, doi: 10.1109/CVCBT.2018.00016. (Year: 2018).*

(Continued)

*Primary Examiner* — Eduardo Castilho
(74) *Attorney, Agent, or Firm* — Tarolli, Sundheim, Covell & Tummino LLP

(57) ABSTRACT

The invention provides methods and systems by which an agreed set of conditions governing transfers on a blockchain (e.g. the Bitcoin blockchain) can be generated and enforced. Advantageously, the conditions can be used to specify and influence the behaviour of another party who will be receiving the asset, by enforcing their fulfilment of an agreed set of rules. In one embodiment, a computer-implemented method comprises the step of providing, to a recipient, a representation of at least one rule (r) relating to a transfer to be conducted over a blockchain network. It also comprises the step of receiving, from a sender: a redeem script (R) which comprises the representation (r); and a script address comprising a hash (HR) of the redeem script (R). It also (Continued)

comprises the step of generating a hash (H) of the redeem script (R) and comparing it with the script address. If the hash (H) matches the script address, the sender can use the script address in a locking script associated with an output of a blockchain transaction ($TX_0$) safe in the knowledge that the rules (r) will be enforced in order to unlock the asset.

17 Claims, 2 Drawing Sheets

(51) Int. Cl.
*G06Q 20/06* (2012.01)
*G06Q 20/40* (2012.01)

(56) References Cited

U.S. PATENT DOCUMENTS

| | | | |
|---|---|---|---|
| 2017/0228727 A1* | 8/2017 | Forzley | G06Q 20/3823 |
| 2018/0240107 A1* | 8/2018 | Andrade | G06Q 20/065 |
| 2018/0247191 A1* | 8/2018 | Katz | G06Q 20/12 |
| 2019/0220859 A1* | 7/2019 | Weight | G06Q 20/381 |
| 2019/0296903 A1* | 9/2019 | Ramesh | G06Q 20/3827 |
| 2019/0356481 A1* | 11/2019 | Spector | G06Q 20/389 |
| 2020/0136815 A1* | 4/2020 | Trevethan | H04L 9/08 |
| 2020/0193432 A1* | 6/2020 | Millar | G06Q 20/401 |

FOREIGN PATENT DOCUMENTS

| | | |
|---|---|---|
| TW | 201732705 A | 9/2017 |
| WO | 2017178956 A1 | 10/2017 |

OTHER PUBLICATIONS

Andrychowicz et al., ""Modeling Bitcoin Contracts by Timed Automata,"" arXiv:1405.1861 [cs.CR], 2014 (Year: 2014).*
D. A. Wijaya, "Extending asset management system functionality in bitcoin platform," 2016 International Conference on Computer, Control, Informatics and its Applications (IC3INA), Tangerang, Indonesia, 2016, pp. 97-101, doi: 10.1109/IC3INA.2016.7863031. (Year: 2016).*
Andresen, "bip-0016.mediawiki," retrieved from https://web.archive.org/web/20181114021954/https://github.com/bitcoin/bips/blob/master/bip-0016.mediawiki, 2018, retrieved on Nov. 18, 2018 (Year: 2018).*
Blum et al., "The Complexity of Human Computation: A Concrete Model with an Application to Passwords," Archiv.org, 2017, retrieved from https://arxiv.org/abs/1707.01204 (Year: 2017).*
Franco, "Understanding Bitcoin: Cryptography, Engineering and Economics," O'Reilly, Chapter 6 Transactions, 2014, ISBN: 978-1-119-01916-9 (Year: 2014).*
I. Gerhardt, T. Hanke, "Homomorphic Payment Addresses and the Pay-to-Contract Protocol," arXiv:1212.3257, 2012, retrieved from https://doi.org/10.48550/arXiv.1212.3257 (Year: 2012).*
Pour, "Bitcoin multisig the hard way: Understanding raw P2SH multisig transactions", 2014, retrieved on Oct. 27, 2015 from https://www.soroushjp.com/2014/12/20/bitcoin-multisig-the-hard-way-understanding-raw-multisignature-bitcoin-transactions/ (Year: 2014).*
"Heilman et al., ""TumbleBit: An Untrusted Bitcoin-Compatible Anonymous Payment Hub,"" NDSS Symposium, 2017, DOI:10.14722/ndss.2017.23086" (Year: 2017).*
Antonopolous, "Mastering Bitcoin," 2nd Edition, 2017, O'Reilly Media, Inc. (Year: 2017).*
Satoshi et al., "Connection Limits," Bitcoin Forum, Aug. 9, 2010, https://bitcointalk.org/index.php?topic=741.0; prev_next=prev, 2 pages.
Nakamoto, "Bitcoin: A Peer-to-Peer Electronic Cash System," Bitcoin, Oct. 31, 2008, https://bitcoin.org/bitcoin.pdf, 9 pages.
Antonopoulos, "Mastering Bitcoin—Unlocking Digital Cryptocurrencies," O'Reilly Media, Inc., Dec. 20, 2014, 282 pages.
Anonymous, "Contract—Bitcoin Wiki", Oct. 22, 2015, https://en.bitcoin.it/w/index.php?title=Contract&olid=59172, 12 pages.
Anonymous: "Pay to Script Has—Bitcoin Wiki", Jan. 29, 2016, https://en.bitcoin.it/wiki/Pay_to_script hash, 1 page.
International Search Report and Written Opinion mailed Mar. 24, 2020, Patent Application No. PCT/IB2019/060897, 12 pages.
UK IPO Search Report mailed Jun. 5, 2019, Patent Application No. GB1820947.8, 9 pages.
Wright, C. and Serguieva, A. "Sustainable Blockchain" Enabled Services: Smart Contracts, 2017 IEEE International Conference on Big Data, 2017, pp. 4255-4264.
Taiwan Patent Office, "Search Report" in Application No. 108146704, Mar. 20, 2024, 2 pages.

* cited by examiner

COMPUTER-IMPLEMENTED SYSTEMS AND METHODS FOR CONTROLLING OR ENFORCING PERFORMANCE OF TRANSFERS CONDUCTED OVER A BLOCKCHAIN

This invention relates generally to distributed computing networks and more particularly to distributed ledger technologies (blockchains). The invention provides advantages relating to security, enforcement and control of transfers and communications which are conducted between participants on a blockchain network. It provides a solution for enforcing how future transfers over the network can be performed, thus solving a problem hitherto believed within the field to be not possible. It is suited, but not limited to, use with machine executable smart contracts.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "Bitcoin" is used herein to refer to any version or variation of a protocol which derives from the Bitcoin protocol. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems.

It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc.) while being more versatile in their applications. One such area of research and interest, for example, is the use of blockchains for the implementation of "smart contracts".

In order to provide a more versatile blockchain platform, it would be advantageous to be able to control or influence how "onward" transfers are made on the network following an initial transfer of an asset between participants, Alice and Bob. In many different types of scenarios, and for many different reasons, it would be desirable to put rules (i.e. conditions or criteria) in place which would govern subsequent transfer(s) of the asset from Bob to one or more others without the need for trust between parties. Until now, it has been believed within the technical community that it is not possible to put binding constraints on future blockchain transactions.

The applicant has devised an invention which addresses at least this need. The invention is defined in the claims appended herein.

In accordance with an embodiment of the invention there may be provided a computer-implemented method comprising the steps:
 generating a representation of at least one rule (r) relating to a transfer to be conducted over a blockchain network;
 generating a redeem script (R) which comprises the representation (r); and a script address comprising a hash (HR) of the redeem script (R);
 comparing a hash (H) of the redeem script (R) with (against) the script address; and
 using the script address in a locking script associated with an output (UTXO) of a blockchain transaction ($TX_0$) if the hash (H) matches the script address.

Additionally or alternatively, there may be provided a computer-implemented method comprising the steps:
 providing, to a recipient, a representation of at least one rule (r) relating to a transfer to be conducted over a blockchain network;
 receiving, from a sender: a redeem script (R) which comprises the representation (r); and a script address comprising a hash (HR) of the redeem script (R);
 generating a hash (H) of the redeem script (R) and comparing it with the script address;
 if the hash (H) matches the script address, using the script address in a locking script associated with an output of a blockchain transaction ($TX_0$).

Additionally or alternatively, there may be provided a computer-implemented method comprising the steps:
 receiving, from a sender, a representation of at least one rule (r) relating to a transfer to be conducted over a blockchain network;
 sending, to the sender: a redeem script (R) which comprises the representation (r); and a script address comprising a hash (HR) of the redeem script (R);
 providing the redeem script (R) in a further blockchain transaction ($TX_1$) arranged to unlock an output in a blockchain transaction ($TX_0$) that is locked to the script address.

The blockchain network may be the Bitcoin network or variant thereof, or another (non-Bitcoin) blockchain network. The method may comprise the step of generating a hash of the redeem script. It may comprise the step of generating, updating and/or completing the blockchain transaction ($TX_0$).

Embodiments of the disclosure may further comprise any step(s) included in FIG. 1 or in the description provided below.

One or more embodiments may further comprise the step of:

generating and/or using a further blockchain transaction ($TX_1$) comprising an unlocking script arranged to use the script address to unlock the locking script of the transaction ($TX_0$).

Preferably, the transaction $TX_0$, and/or the further transaction $TX_1$, is a transaction type which allows cryptocurrency to be sent to/associated with/locked by a script hash in the locking script of an output, and which requires a user to provide, in an unlocking script, a script matching the script hash and data which makes the script evaluate to true in order to obtain (unlock) the cryptocurrency. If the blockchain network is the Bitcoin network or variation thereof, this may be a Pay-to-script-hash (P2SH) transaction. If the blockchain network is not the Bitcoin network or a variant thereof, the transaction may be of a functionally equivalent/similar transaction type in accordance with another (non-Bitcoin) blockchain protocol.

Preferably, the representation (r) is a blockchain script or a portion/snippet of code written in a blockchain scripting language, a text file, a smart contract, an image, and/or a reference to, or identifier of, a location where the at least one rule can be accessed.

Preferably, the at least one rule relates to how or to whom a subsequent transfer may be made over the blockchain network.

Preferably, the representation (r) of the at least one rule is provided to the recipient as part of an incomplete blockchain transaction, or provided as a snippet of blockchain scripting code.

Preferably, the script address is provided as part of a blockchain transaction.

Preferably, the method further comprises the step of submitting the transaction to a blockchain network.

Preferably, the at least one rule specifies a cryptographic signature that must be provided in order to unlock an asset on the blockchain.

The disclosure also provides a computer-implemented system comprising:

a processor; and memory including executable instructions that, as a result of execution by the processor, causes the system to perform any embodiment of the computer-implemented method as described herein.

The disclosure also provides a non-transitory computer-readable storage medium having stored thereon executable instructions that, as a result of being executed by a processor of a computer system, cause the computer system to at least perform an embodiment of the invention as described herein.

These and other aspects of the present invention will be apparent from and elucidated with reference to, the embodiment described herein. An embodiment of the present disclosure will now be described, by way of example only, and with reference to the accompany drawings, in which.

DETAILED DESCRIPTION

Figure 1:
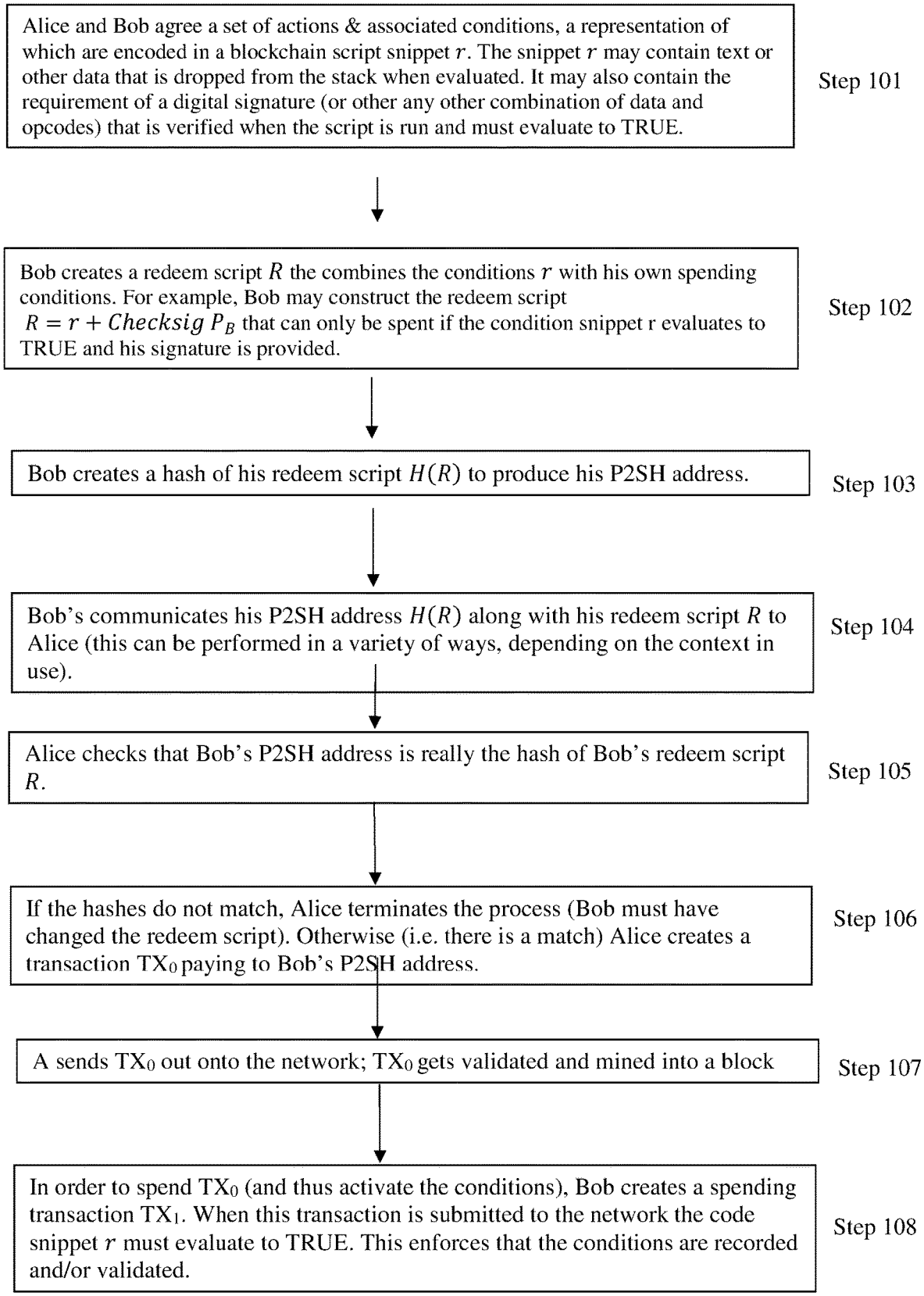
FIG. 1 illustrates a flowchart illustrating, at a high level, an embodiment of the disclosure.

Embodiments of the present disclosure provide a novel and advantageous mechanism for controlling electronic transfers via a blockchain network. It has traditionally been held that it is not possible to constrain, force, influence or control onward ("downstream") exchanges made via subsequent transactions over the blockchain network. For example, if Alice makes a transfer to Bob via a blockchain transaction, it is traditionally considered not possible for Alice to dictate or control the transfer(s) that Bob (or other recipients even further down the chain of transfer) then make. Once Bob has received the transferred asset(s) from Alice, he is free to act as he chooses. This is not desirable in many situations, because it is not uncommon for users to wish to route their communications in a particular way, or place constraints on how and/or who handles transfers of their electronic assets, data and communications.

The present disclosure addresses this issue by providing a cryptographically enforced mechanism by which a party can inject conditions, constraints and rules into an initial transfer for influence of onward transmission. It does this by way of a mathematically enforced control technique which enables secure, immutable, visible and traceable conditions to be associated with future actions that have yet to be performed over the blockchain network.

Prior to providing a detailed example of an embodiment, we provide a brief summary of some of the known techniques that are used to advantage by the disclosure, by way of technical background only.

Pay-to-Script-Hash (P2SH)

Unlike standard blockchain transactions within the Bitcoin protocol, which enable payments to a hash of a public key, a P2SH transaction allows a sender to pay to a hash of a script. In a traditional transaction, the output comprises a (locking) script that must evaluate to TRUE when a spend attempt is made. The locking script will specify who must sign in order to unlock the associated output. With a P2SH transaction, on the other hand, the output does not include the script itself, only a hash of the locking script. So a P2SH address contains a hashed script and can be identified because it starts with a 3 (whereas a public key hash address starts with a 1).

Instead of requiring a would-be recipient of funds to provide the signature matching a public key specified in the locking script of the unspent output (UTXO), a P2SH transaction requires the recipient to supply a script (known as the redeem script, which we refer to herein as R) which hashes to the same hash in the locking script, and also supply the data that is required to satisfy any conditions set out in the locking script such that the data will cause the script to evaluate to TRUE. If the redeem script hashes match, and the correct data is provided to enable a TRUE evaluation of the UTXO's locking script, the funds associated with the output are unlocked and control is transferred to the recipient. It should be noted that in accordance with embodiments of the disclosure which are implemented using a different (non-Bitcoin based) blockchain protocol, the transaction type may be called something else other than "P2SH". However, the functionality may be essentially the same in that the would-be recipient of the transaction's locked funds must provide the script which, when hashed, matches the hash provided in the transaction output's locking script. For the sake of ease of reference, though, we shall use the term "P2SH" to refer to such a transaction type having this functionality/characteristics.

Smart Contracts

A smart contract is a computer program designed to automate the execution of the conditions of a machine-readable contract or agreement. Unlike a traditional contract which would be written in natural language, a smart contract is a machine readable and executable program which comprises rules that can process inputs in order to produce results, which can then cause actions to be performed dependent upon those results.

An Illustrative Embodiment Providing an Overview of the Disclosure

Suppose that Alice owns a certain amount of cryptocurrency, or a tokenised asset or other resource on a blockchain. She creates a set of conditions or rules r that dictate the terms in which her asset is to be transferred and/or accessed. The set of rules are formulated in the Bitcoin scripting language, Script, in Bitcoin-related implementations, or possibly some other language if a different blockchain protocol is used.

Alice would like to transfer her asset to Bob and ensure that Bob also follows these rules when he unlocks the asset on the blockchain. For example, the rule(s) r might be that her asset can only be unlocked if the signature of Eve is also provided. In Bitcoin script this condition would be expressed as:

$$r = \text{OP\_DUP OP\_HASH160} <H(P_E)> \text{OP\_EQUALVERIFY OP\_CHECKSIGVERIFY} \quad (1)$$

Where $P_E$ is Eve's public key. This script will only evaluate to TRUE if it is provided with the input $$r_{Input} = <\text{Sig } P_E><P_E>$$

Now consider the following scenario:

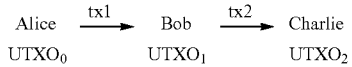

Alice imposes the rules r on the first transaction $tx_1$ from herself to Bob.

Alice may impose that the next transaction from Bob to Charlie also follows the same rules. That is, the spending of the output $UTXO_1$ from $tx_1$ is subject to the same rules r as the spending of output $UTXO_0$. This is done as follows.

1. Alice sends the set of rules r to Bob. Recall that the rules are expressed as a blockchain script snippet, for example as shown above in (1).
2. Bob creates a redeem script R that contains the rules r together with his own rules, for example the requirement of his own signature.

$$R_B = r + \text{Checksig } P_B$$

3. Bob creates a Pay to Script Hash (P2SH) address $P_1$ based on the redeem script $R_B$.
4. Bob sends his P2SH address $P_1$ together with the redeem script $R_B$ to Alice.
5. Alice checks that Bob's P2SH address $P_1$ corresponds to the hash of the redeem script R.

Alice can now be sure that when she creates a transaction $tx_1$ that is locked to Bob's P2SH address it will be subject to the rules r. In order for Bob to unlock the asset by creating a further transaction $tx_2$ the rules r must be satisfied in Bob's unlocking script, otherwise the result will be FALSE and the output will not be unlocked.

Step-Through Example of the Invention in Use

For the reader's ease of understanding, we now provide a more detailed, stepped through example of an illustrative embodiment of the invention as it may be put into use, with reference to FIG. 1.

In step 101, a plurality of parties, e.g. Alice and Bob, decide upon a course of action, governed by a set of conditions, rules or criteria (which we will simply refer to as "rules" r hereafter). This could be any type of action such as a transfer of cryptocurrency or a token held on the blockchain, or the purchase/rental/provision of some apparatus, goods or services, etc. Similarly, the conditions could be any constraint upon the performance of the action e.g. Alice will transfer a tokenised entity on the blockchain to Bob upon confirmation of a specified event.

Alice (or some other party) generates a representation of the rules r. The representation could take any form, such as a text file, or a picture, or a sound file, script etc. It is, essentially, a record of the agreed actions and conditions/rules/criteria that govern the performance of those actions. In some embodiments, it could be a smart contract, as known in the art and explained above. In a preferred embodiment, the conditions are expressed in the Bitcoin scripting language Script or some other blockchain-compatible and executable language. Therefore, r could be a snippet or portion of (blockchain scripting) code.

In step 102, Bob uses Alice's script snippet r to generate a redeem Script R. Thus, the redeem script R incudes the rules r. Bob may also include some additional rules of his own.

In step 103, Bob uses the redeem script R to generate a hash H(R) which he can use as his P2SH address.

In step 104, Bob sends his P2SH address and the redeem script R to Alice. This can be performed in any suitable manner. Alice can then be sure that the redeem script R includes her rules r.

In steps 105 and 106, Alice checks that the P2SH supplied by Bob is the hash of Bob's redeem script. This is a quick and computationally simple process. If they do not match, then Alice can choose to terminate the transaction or query it. If they do match, however, she can proceed in the knowledge that her rules have been included and will be enforced so she generates a blockchain transaction $TX_0$ which she sends out to the network in step 107 for validation and to be mined into a block.

In step 108, when Bob wishes to access the asset locked by Alice in $TX_0$, he generates a spending transaction $TX_1$ which includes an output (UTXO) that will provide the required redeem script R to the locking script of $TX_0$, to release the asset. In order for that to happen, the snippet r must evaluate to TRUE, which ensures that the rules r originally specified by Alice have been enforced.

In an alternative embodiment, the above process may be performed by generating an incomplete, partial transaction. This can be done by Alice inserting the snippet r into the locking script of a partially complete P2SH transaction, $TX_0$. The locking script is associated with an unspent output, UTXO, of $TX_0$ and determines how the UTXO can be unlocked by a further, subsequent transaction $TX_1$. $TX_0$ is incomplete because it does not yet include the P2SH address. This will be supplied by Bob.

As per step 103, the partial transaction $TX_0$ (including the snippet r) is communicated to Bob. This can be achieved in a variety of ways. Bob is able to check that the rules in r match those which Alice and Bob agreed in step 101.

As per step 103, Bob creates a redeem script R which comprises the rules r, and then a hash of R to produce his P2SH address. In step 104, Bob's redeem script R, plus the P2SH, are communicated to Alice by Bob inserting his P2SH address into transaction $TX_0$ and sending it back to Alice. R can be sent via any suitable method. From Bob's updated version of $TX_0$, Alice can check that the P2SH address he has supplied matches the hash of the redeem script R which includes the rules r.

In step 107, Alice submits $TX_0$ to the blockchain network as above. It is validated and mined into a block in accordance with known techniques. Bob, of course, wishes to spend the UTXO in $TX_0$, so must unlock it in Step 108. In order to unlock the UTXO, he has to provide the necessary hash for the redeem script of the UTXO, so he generates a spending transaction $TX_1$, that includes $TX_1$'s unlocking script. $TX_1$ is then put out onto the blockchain, validated and mined, so that the hash will be presented to the redeem script in $TX_0$, the output will be unlocked and the transfer of the asset (eg portion of cryptocurrency, token etc.) takes place. Now Bob is in possession of the asset.

Thus, the invention provides a solution to a problem which was previously considered insolvable within the technical field, and enables control, enforcement and constraint of subsequent transfers between parties on a blockchain network, via the use of mathematical and cryptographic techniques.

Figure 2:
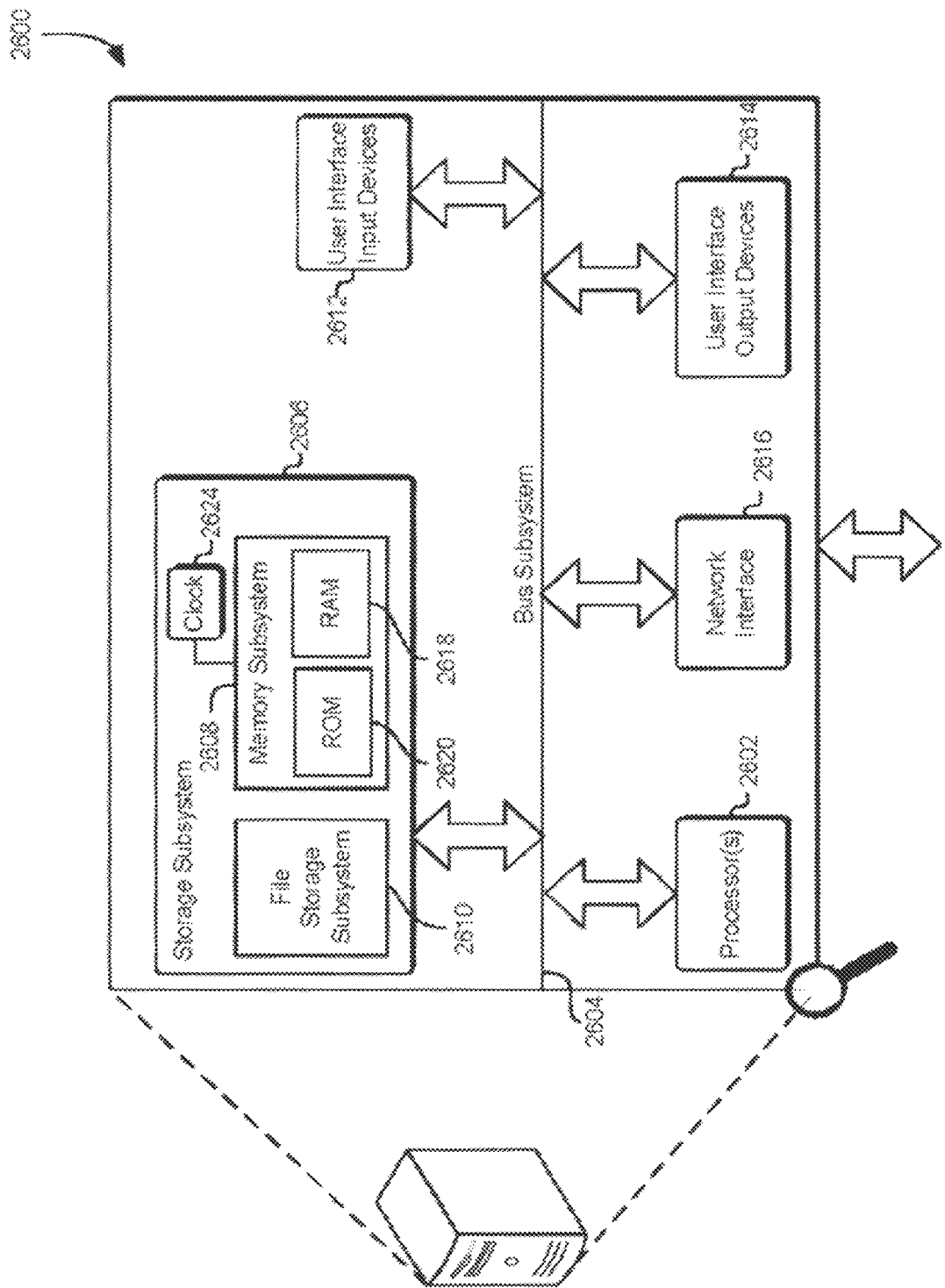
FIG. 2 is a schematic diagram illustrates a computing environment in which various embodiments can be implemented.

Turning now to FIG. 2, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 2, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 2 is intended only as a specific example for purposes of illustrating the preferred embodiment of the device. Many other configurations having more or fewer components than the system depicted in FIG. 2 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising the steps:
agreeing, between a first party and a second party, at least one rule (r) relating to a condition of at least two subsequent transfers to be performed after an initial transfer to be conducted over a blockchain network;
generating, by the first party, a representation of the at least one rule (r);
generating, by the second party, a redeem script (R) which comprises the representation of the at least one rule (r);
generating, by the second party, a script address comprising a hash (HR) of the redeem script (R);
comparing, by the first party, a hash (H) of the redeem script (R) with the script address;
using, by the first party, the script address in a locking script associated with an output of a blockchain transaction (TX) when the hash (H) matches the script address, wherein the initial transfer is the blockchain transaction ($TX_0$);
generating, by the second party, a first one of the at least two subsequent transfers comprising a further blockchain transaction ($TX_1$), the further blockchain transaction ($TX_1$) comprising an unlocking script arranged to use the script address to unlock the locking script of the blockchain transaction ($TX_0$); and
wherein the further blockchain transaction ($TX_1$) comprises a further output locked using the at least one rule (r), such that the at least one rule (r) is applied to a second one of the at least two subsequent transfers.

2. The method according to claim 1, wherein the blockchain transaction ($TX_0$), and/or the further blockchain transaction ($TX_1$), is a Pay-to-Script-Hash (P2SH) transaction type in Bitcoin protocol.

3. The method according to claim 1, wherein the representation of the at least one rule (r) is a blockchain script or a portion of code written in a blockchain scripting language, a text file, a smart contract, an image, a reference to or identifier of a location where the at least one rule can be accessed.

4. The method according to claim 1, wherein:
the at least one rule relates to how or to whom a subsequent transfer may be made over the blockchain network.

5. The method according to claim 1, wherein the representation of the at least one rule (r) of the at least one rule is provided to a recipient as a part of an incomplete blockchain transaction or provided as a snippet of blockchain scripting code.

6. The method according to claim 1, wherein the script address is provided as part of a blockchain transaction.

7. The method according to claim 1, and further comprising the step of submitting, by the second party, the further blockchain transaction ($TX_1$) to the blockchain network.

8. The method according to claim 1, wherein the at least one rule specifies a cryptographic signature that must be provided in order to unlock an asset on the blockchain.

9. A computer-implemented system comprising:
a processor; and
memory including executable instructions that, as a result of execution by the processor, cause the system to perform any embodiment of the computer-implemented method comprising the steps:
agreeing, between a first party and a second party, at least one rule (r) relating to a condition of at least two subsequent transfers to be performed after an initial transfer to be conducted over a blockchain network;
generating, by the first party, a representation of the at least one rule (r);
generating, by the second party, a redeem script (R) which comprises the representation of the at least one rule (r);
generating, by the second party, a script address comprising a hash (HR) of the redeem script (R);
comparing, by the first party, a hash (H) of the redeem script (R) with the script address;
using, by the first party, the script address in a locking script associated with an output of a blockchain transaction (TX) when the hash (H) matches the script address, wherein the initial transfer is the blockchain transaction ($TX_0$);
generating, by the second party, a first one of the at least two subsequent transfers comprising a further blockchain transaction ($TX_1$), the further blockchain transaction ($TX_1$) comprising an unlocking script arranged to use the script address to unlock the locking script of the blockchain transaction ($TX_0$); and
wherein the further blockchain transaction ($TX_1$) comprises a further output locked using the at least one rule (r), such that the at least one rule (r) is applied to a second one of the at least two subsequent transfers.

10. The system according to claim 9, wherein the blockchain transaction ($TX_0$), and/or the further blockchain transaction ($TX_1$), is a Pay-to-Script-Hash (P2SH) transaction type in Bitcoin protocol.

11. The system according to claim 9, wherein the representation of the at least one rule (r) is a blockchain script or a portion of code written in a blockchain scripting language, a text file, a smart contract, an image, a reference to or identifier of a location where the at least one rule can be accessed.

12. The system according to claim 9, wherein:
the at least one rule relates to how or to whom a subsequent transfer may be made over the blockchain network.

13. The system according to claim 9, wherein the representation of the at least one rule (r) is provided to a recipient as a part of an incomplete blockchain transaction or provided as a snippet of blockchain scripting code.

14. The system according to claim 9, wherein the script address is provided as part of a blockchain transaction.

15. The system according to claim 9, and further comprising the step of submitting, by the second party, the further blockchain transaction ($Tx_1$) to the blockchain network.

16. The system according to claim 9, wherein the at least one rule specifies a cryptographic signature that must be provided in order to unlock an asset on the blockchain.

17. A non-transitory computer-readable storage medium having stored thereon executable instructions that, as a result of being executed by a processor of a computer system, cause the computer system to at least perform a method comprising the steps:

agreeing, between a first party and a second party, at least one rule (r) relating to a condition of a subsequent transfer to be performed after an initial transfer to be conducted over a blockchain network;

generating, by the first party, a representation of the at least one rule (r);

generating, by the second party, a redeem script (R) which comprises the representation of the at least one rule (r);

generating, by the second party, a script address comprising a hash (HR) of the redeem script (R); comparing a hash (H) of the redeem script (R) with the script address;

using, by the first party, the script address in a locking script associated with an output of a blockchain transaction ($TX_0$) when the hash (H) matches the script address, wherein the initial transfer is the blockchain transaction ($TX_0$); and generating, by the second party, a first one of the at least two subsequent transfers comprising a further blockchain transaction ($TX_1$), the further blockchain transaction ($TX_1$) comprising an unlocking script arranged to use the script address to unlock the locking script of the blockchain transaction ($TX_0$); and wherein the further blockchain transaction ($TX_1$) comprises a further output locked using the at least one rule (r), such that the at least one rule (r) is applied to a second one of the at least two subsequent transfers.

* * * * *